United States Patent
Creed

(10) Patent No.: US 12,487,886 B1
(45) Date of Patent: Dec. 2, 2025

(54) INTELLIGENT FAULTY COMPONENT ERROR PATTERN RECOGNITION AND FAULT ISOLATION

(71) Applicant: Dell Products, L.P., Hopkinton, MA (US)

(72) Inventor: John Creed, Innishannon (IE)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/731,295

(22) Filed: Jun. 2, 2024

(51) Int. Cl.
*G06F 11/10* (2006.01)
*G06F 11/07* (2006.01)

(52) U.S. Cl.
CPC ...... *G06F 11/1092* (2013.01); *G06F 11/0787* (2013.01); *G06F 11/079* (2013.01)

(58) Field of Classification Search
CPC . G06F 11/1092; G06F 11/0787; G06F 11/079
See application file for complete search history.

(56) References Cited

U.S. PATENT DOCUMENTS

| | | | |
|---|---|---|---|
| 12,210,401 B2* | 1/2025 | Bielby | G06F 11/3065 |
| 2024/0354176 A1* | 10/2024 | Sampath | G06N 3/088 |
| 2025/0053499 A1* | 2/2025 | Ayyadurai | G06F 11/3698 |

OTHER PUBLICATIONS

Liu et al. "Fault Detection, Diagnosis, and Prognosis: Software Agent Solutions," IEEE, Jul. 4, 2007. (Year: 2007).*
Wang et al. "Constructing the Knowledge Base for Cognitive IT Service Management," IEEE, 2017. (Year: 2017).*
Samir & Pahl. "A Controller Architecture for Anomaly Detection, Root Cause Analysis and Self-Adaptation for Cluster Architectures." 2019. (Year: 2019).*

* cited by examiner

*Primary Examiner* — Bryce P Bonzo
*Assistant Examiner* — Audrey Emma Whitesell
(74) *Attorney, Agent, or Firm* — Anderson Gorecki LLP

(57) ABSTRACT

A method of intelligently recognizing faulty component error patterns to prevent cascading errors from causing indictment of healthy hardware components includes a system hardware error manager with a trained error analysis engine. The error analysis engine is trained using labeled training examples correlating storage system error patterns with component indictments and unindictable dependent components. The trained error analysis engine is deployed to monitor sequences of error messages to recognize error patterns generated by components of an operating storage system. In response to recognition of an error pattern, the trained error analysis engine indicts a system component associated with the recognized error pattern. Any errors that were generated by dependent components after the start of the recognized error pattern are reversed. Any dependent components that were indicted based on errors that were generated by the dependent components after the start of the recognized error pattern are also reversed.

19 Claims, 9 Drawing Sheets

Time T1: receive error that could be based on fault of line card or drive

Time T2: receive errors that could be based on fault of line card, drive, or IO module Time T3: receive errors that can only be based on fault of line card Action: Line Card indicted; Errors on drive and IO module decremented

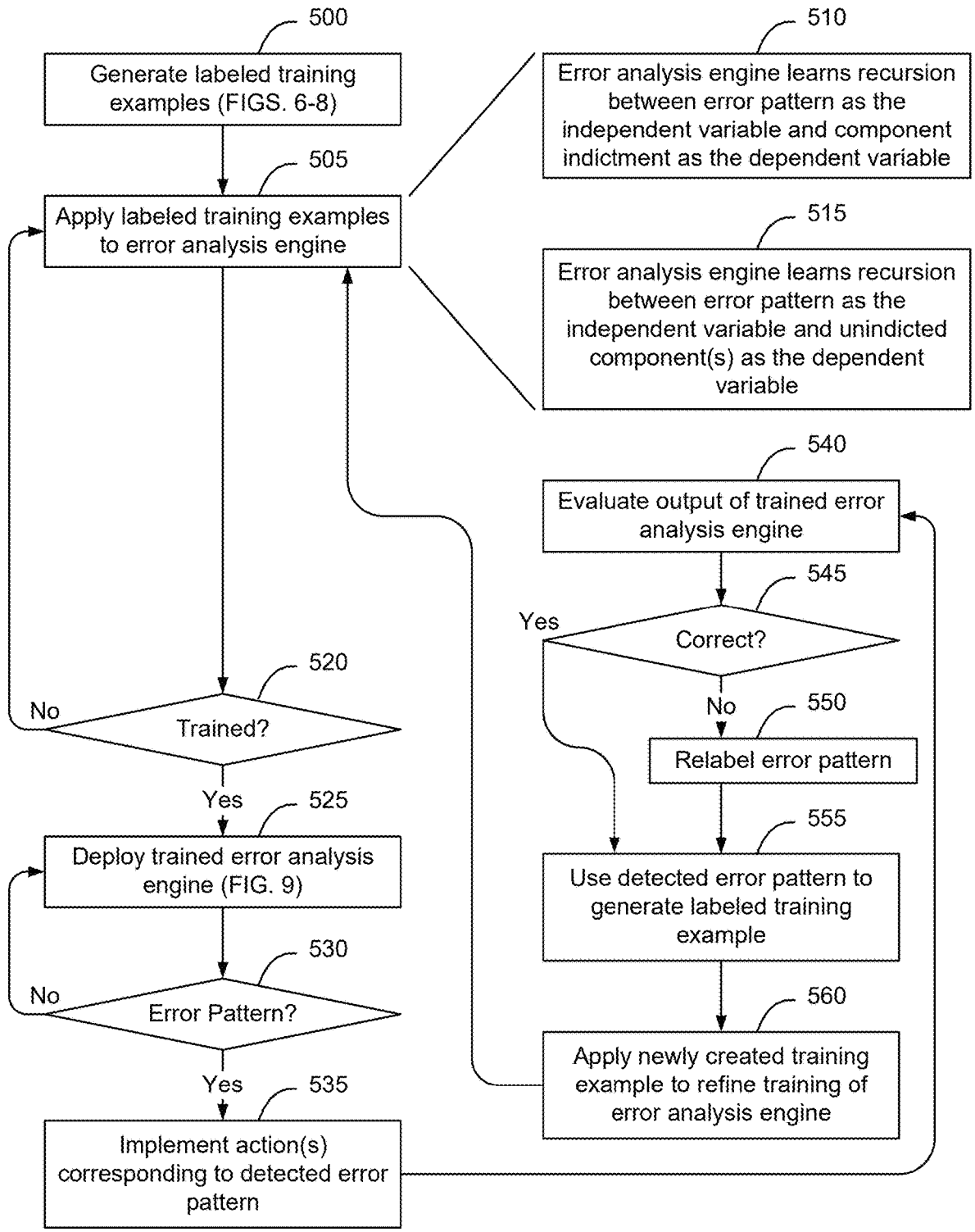

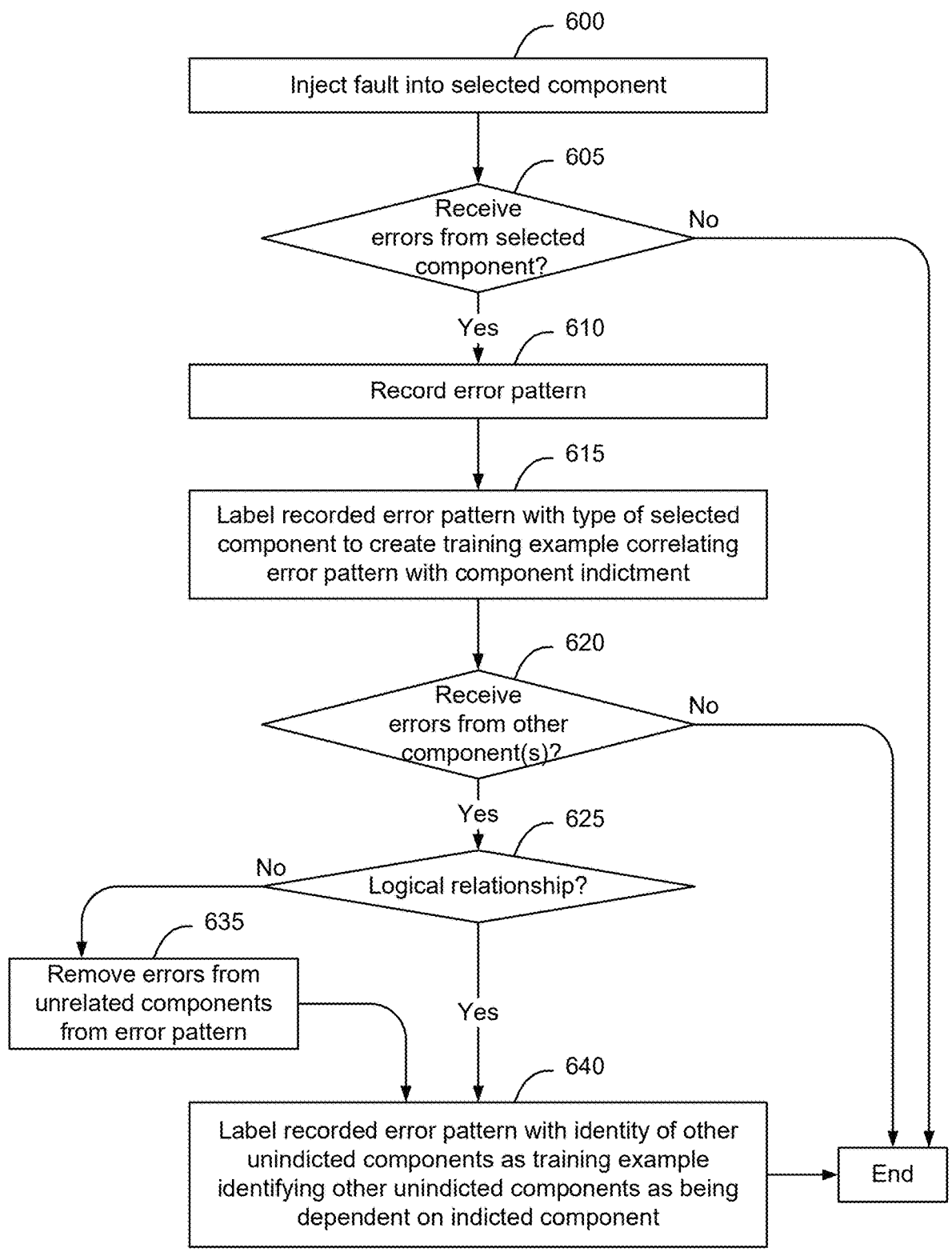

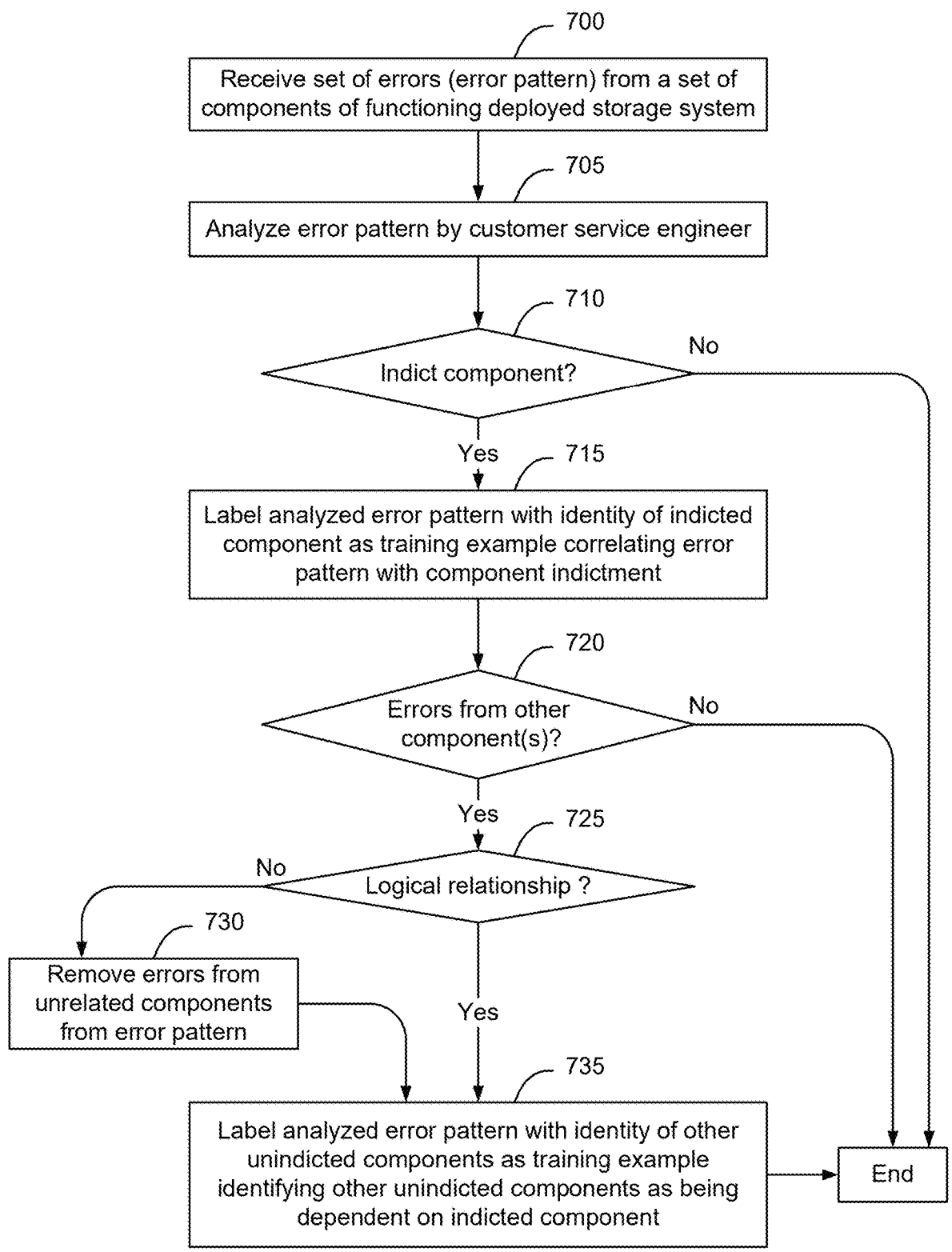

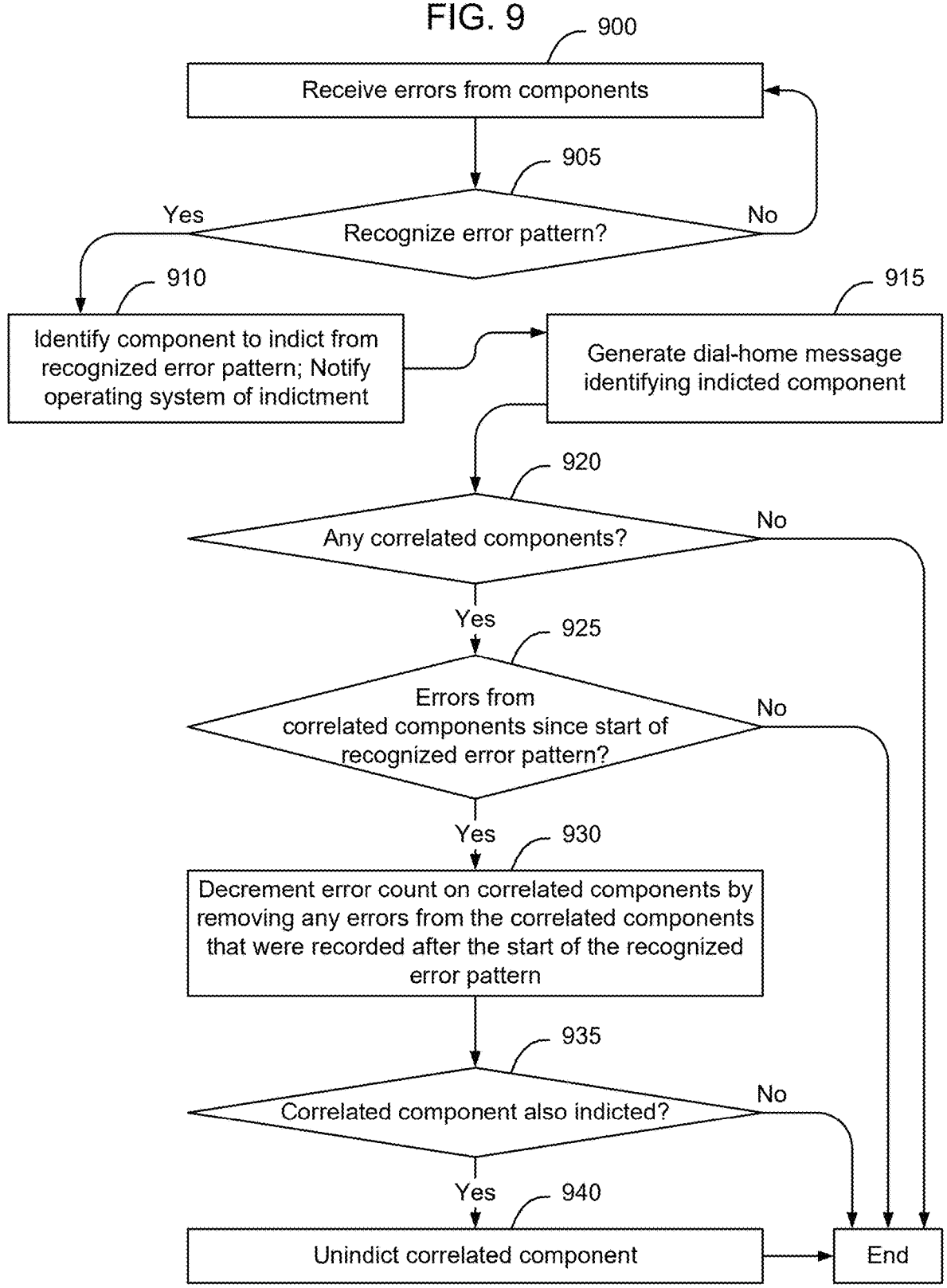

INTELLIGENT FAULTY COMPONENT ERROR PATTERN RECOGNITION AND FAULT ISOLATION

FIELD

This disclosure relates to computing systems and related devices and methods, and, more particularly, to a method and apparatus for training a system hardware error manager to intelligently recognize faulty component error pattens to prevent cascading errors from causing indictment of otherwise healthy hardware components.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A storage system hardware error manager is provided and trained to learn faulty component error patterns to prevent cascading errors from causing indictment of otherwise healthy hardware components. In some embodiments, faulty component error patterns are monitored and intelligently recognized to indict faulty components and to prevent cascading errors from causing indictment of healthy hardware components. In some embodiments a system hardware error manager is provided that includes a trained error analysis engine that is trained using a supervised learning process. The error analysis engine is trained using labeled training examples correlating storage system error patterns with component indictments and unindictable dependent components. The trained error analysis engine is deployed to monitor sequences of error messages to recognize error patterns generated by components of an operating storage system. In response to recognition of an error pattern, the trained error analysis engine indicts a system component associated with the recognized error pattern. Any errors that were generated by dependent components after the start of the recognized error pattern are reversed. Any dependent components that were indicted based on errors that were generated by the dependent components after the start of the recognized error pattern are also reversed.

In some embodiments, a method of intelligently recognizing faulty component error patterns to prevent cascading errors from causing indictment of healthy hardware components, includes receiving, by a system hardware error manager, errors messages from all components of a storage system, and analyzing the error messages by a trained machine learning process to recognize error patterns correlated to storage system component failures, the trained machine learning process having been trained to learn a recursion between the error patterns as independent variables and indictable storage system components and unindictable dependent storage system components as the dependent variable. In response to a determination that the received error messages contain a recognized error pattern, classifying the error pattern to indict the corresponding indictable storage system component and to identify the unindictable dependent storage system components. In further response to the determination that the received error messages contain the recognized error pattern, removing any errors from the unindictable dependent storage system components that were received by the system hardware error manager after a start time of the recognized error pattern.

In some embodiments, the method further includes determining if any of the unindictable dependent storage system components were falsely indicted due to errors that were received by the system hardware error manager after the start time of the recognized error pattern, and in response to a determination that one or more of the unindictable dependent storage system components were falsely indicted, initiating recovery of the unindictable dependent storage system components that were falsely indicted.

In some embodiments, the trained machine learning process is trained using a supervised training process using labeled training examples, each labeled training example including an error pattern containing a sequence of errors that occurred over time and a label, the label identifying a corresponding indictable storage system component.

In some embodiments, a first subset of the errors of the sequence of errors were generated by the indictable storage system component and a second subset of the errors of the sequence of errors were generated by one or more corresponding unindictable components.

In some embodiments, the labeled training examples are created from observed error patterns generated by executing storage systems that are labeled by customer service engineers in connection with performing root cause analysis.

In some embodiments, the labeled training examples are created by injecting errors into components of a storage system, observing respective error pattern that are generated by the storage system, and labeling the respective error pattern with the identity of the component that received the injected error.

In some embodiments, the labeled training examples are created by implementing maintenance operations on a storage system or performing component replacements on the storage system, observing respective error patterns that are generated by the storage system, and labeling the respective error patterns with the identity of the respective maintenance operations or component replacements.

In some embodiments, the trained machine learning process is a classification process, in which observed properties are the error patterns and the categories to be predicted are the identities of the components to be indicated.

In some embodiments, the trained machine learning process is a neural network.

In some embodiments, analyzing the error messages by a trained machine learning process to recognize error patterns correlated to storage system component failures includes determining that an error pattern is associated with one component of a pair of redundant components, determining that the other one component of the pair of redundant components has previously been indicted, and generating a critical dial home event to expedite recovery of the remaining operational component of the pair of redundant components.

BRIEF DESCRIPTION OF THE DRAWINGS

FIG. 5 is a flow chart of an example process of training an error analysis engine to learn a recursion between error patterns and indictable and unindictable interrelated system components, and deploying the trained error analysis engine to analyze system errors and implement actions based on detected learned error patterns, according to some embodiments.

FIGS. 6-8 are flow charts of example methods of creating labeled training examples for use in training the error analysis engine to learn a recursion between error patterns and indictable and unindictable interrelated system components, according to some embodiments.

FIG. 9 is a flow chart of an example process of deploying the trained error analysis engine to analyze system errors and implement actions based on detected learned error patterns, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable storage medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable storage medium and implemented by multi-purpose tangible processors, and any combinations thereof.

Figure 1:
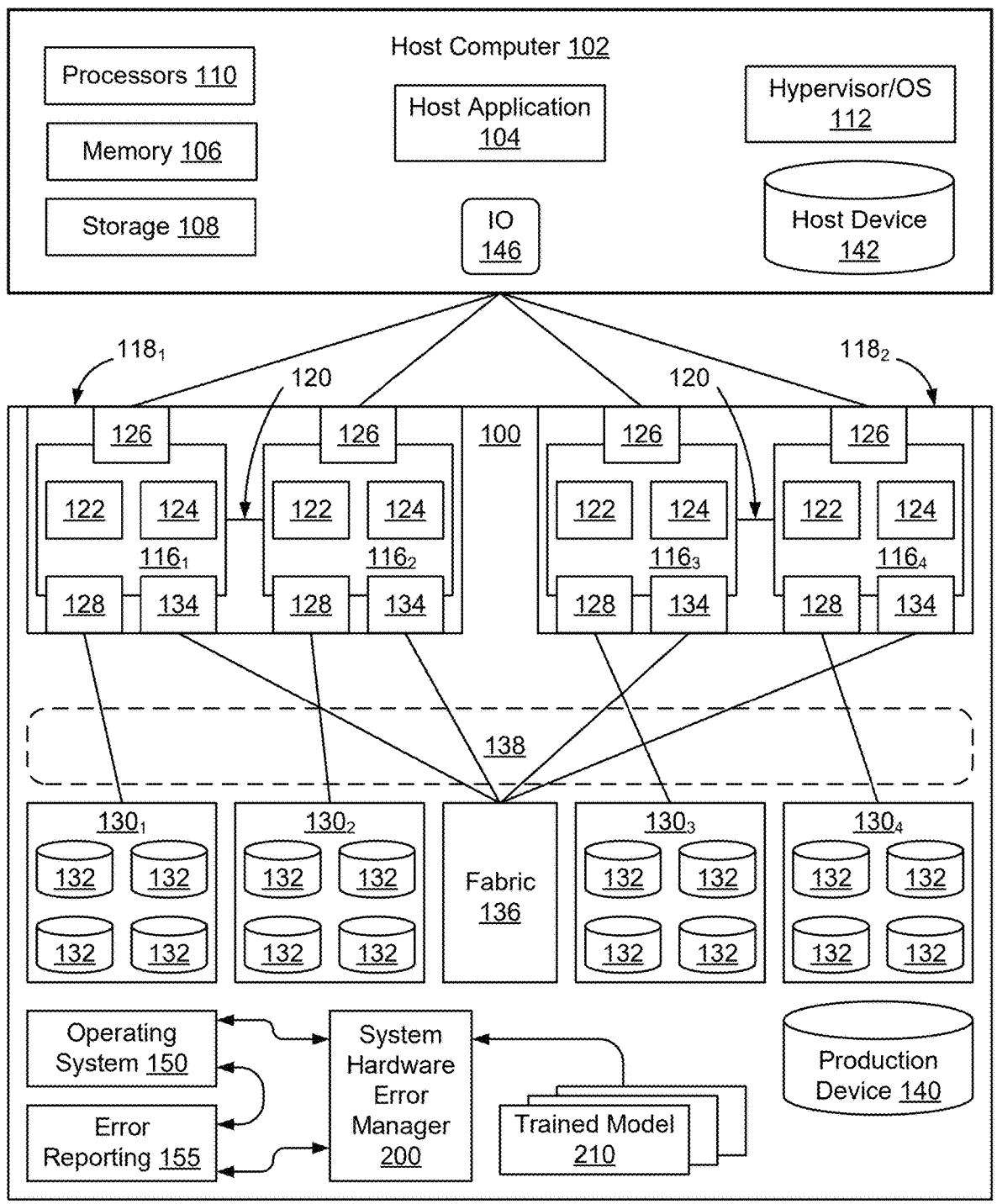
FIG. 1 is a functional block diagram of a host computer connected to an example storage system that includes a system hardware error manager configured to analyze error patterns from system components to intelligently indict and unindict system components based on recognized error patterns, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or over an interconnecting fabric 136. An example interconnecting fabric 136 may be implemented using PCIe or IB. Each compute node 116 may allocate a portion or partition of its respective local volatile memory 124 to a virtual shared memory 138 that can be accessed by any compute node 116 of storage system 100.

The storage system 100 maintains data for host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106 or storage 108. If that is not possible then the IO 146 is sent to one of the compute nodes $116_1$-$116_4$ to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$.

In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

As shown in FIG. 1, storage systems are complex computer systems that include multiple interrelated components. Inevitably software and/or hardware errors may occur, which can interrupt normal operation of the storage system. Conventionally, errors would be reported to the operating system 150 which, depending on the severity of the error, would take corrective action such as to restart the component, shut the component down, etc. The errors may also be reported back to a customer support system using dial home messages describing the error(s), to enable a customer service engineer to analyze the error(s) to determine what corrective action should be taken in response to the error or set of errors.

There are scenarios where failure of one component in the storage system may cause other components to report errors, even where the other components are actually healthy and would not otherwise be generating errors. Unfortunately, the operating system 150 is not equipped to recognize these types of dependent errors and, given the type of error and/or frequency of the error from the interrelated component, the operating system might shut down one or more healthy components in response to failure of another component within the storage system.

According to some embodiments, a system hardware error manager 200 is provided that is trained to recognize error patterns from storage system components on the storage system, to intelligently indict and unindict system components based on recognized error patterns.

Figure 2:
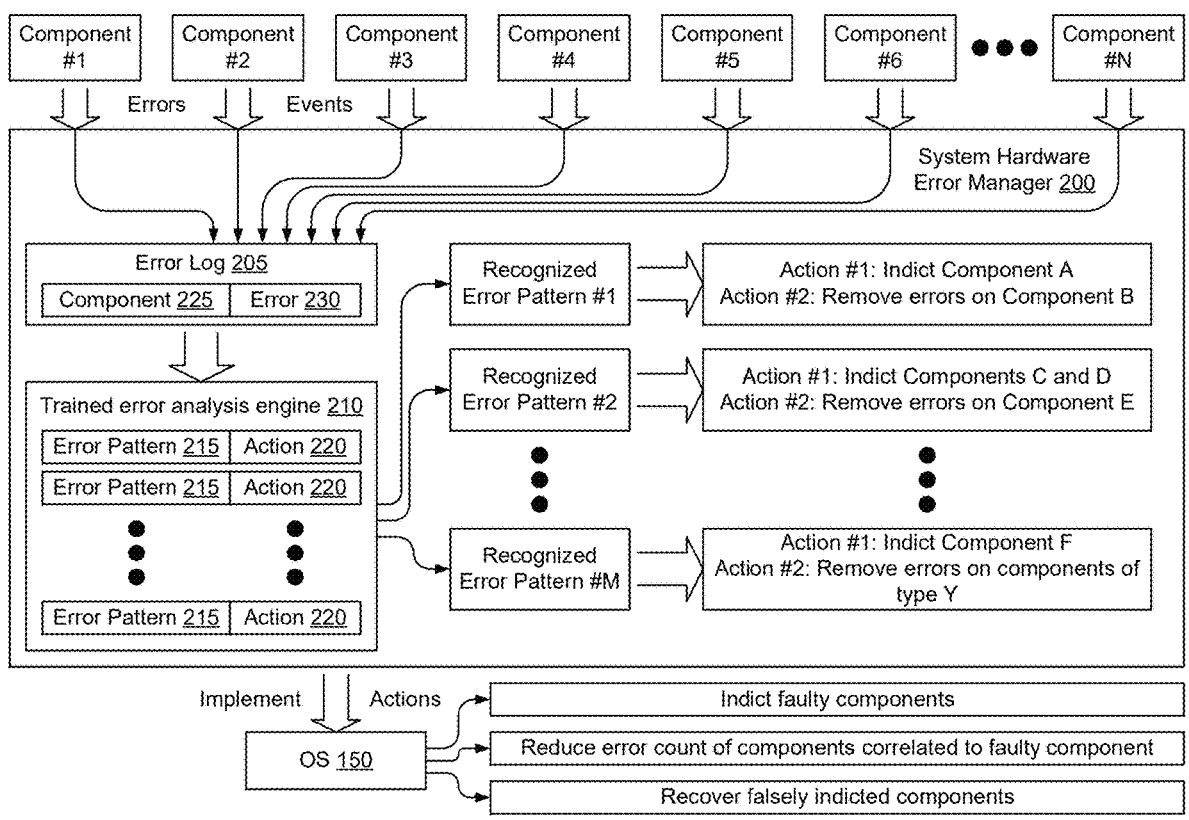
FIG. 2 is a block diagram of an example a system hardware error manager configured to analyze error patterns from system components to intelligently indict and unindict interrelated system components based on recognized error patterns in greater detail, according to some embodiments.

FIG. 2 is a block diagram of an example a system hardware error manager configured to analyze error patterns from system components to intelligently indict and unindict interrelated system components based on recognized error patterns in greater detail, according to some embodiments. As shown in FIG. 2, in some embodiments the system hardware error manager 200 is implemented as a software application configured to receive errors 230 from storage system components 225, log the errors in an error log 205, and analyze the errors using a trained error analysis engine 210. In some embodiments, the trained error analysis engine 210 is trained to learn recursions between error patterns 210 and indictable components and unindictable components. Once deployed, the trained error analysis engine uses the learned recursion to classify components as failed or not failed and, as a result of the classification, implement predetermined sets of responsive actions.

As used herein, the term "indictable component" or "indicted component" is used to refer to a component of the storage system that generates one or more error messages because the component is actually failing or has actually failed. As used herein, the term "unindictable component" or "unindicted component" is used to refer to a storage system component that is not actually failing or has not actually failed and that generates one or more error messages as a result of the failing or failure of an indicted component of the storage system. A component that registers one or more errors may become an unindicted component once another component is indicted, thus enabling the one or more registered errors on the unindicted component to be erased.

As shown in FIG. 2, in some embodiments the system hardware error manager 200 includes a data structure correlating known error patterns 215 with a set of actions 220 to take in response to identification of a known error pattern by the trained error analysis engine 210. While the storage system is operating, errors generated by the components (components #1-#N in FIG. 2) are provided to the system hardware error manager 200 and entered into the error log 205. The trained error analysis engine 210 is deployed and monitors and analyzes the error messages to identify error patterns 215 in the error messages as the error messages are received.

When an error patterns 215 is recognized, the system hardware error manager 200 determines the action 220 associated with the identified error pattern 215. The system hardware error manager 200 then implements the actions associated with the recognized error pattern. In FIG. 1, several example actions are shown. For example, when error pattern #1 is recognized, the action to be implemented by the system hardware error manager 200 is to indict component A and remove any errors that were generated by component B during occurrence of the recognized error pattern #1. Likewise, in response to recognition of error pattern #2, the action to be implemented by the system hardware error manager 200 is to indict components C and D, and to remove any errors that were generated by component E during occurrence of the recognized error pattern #2. Multiple actions may be implemented by the system hardware error manager 200, depending on the particular learned error patterns.

Figure 3:
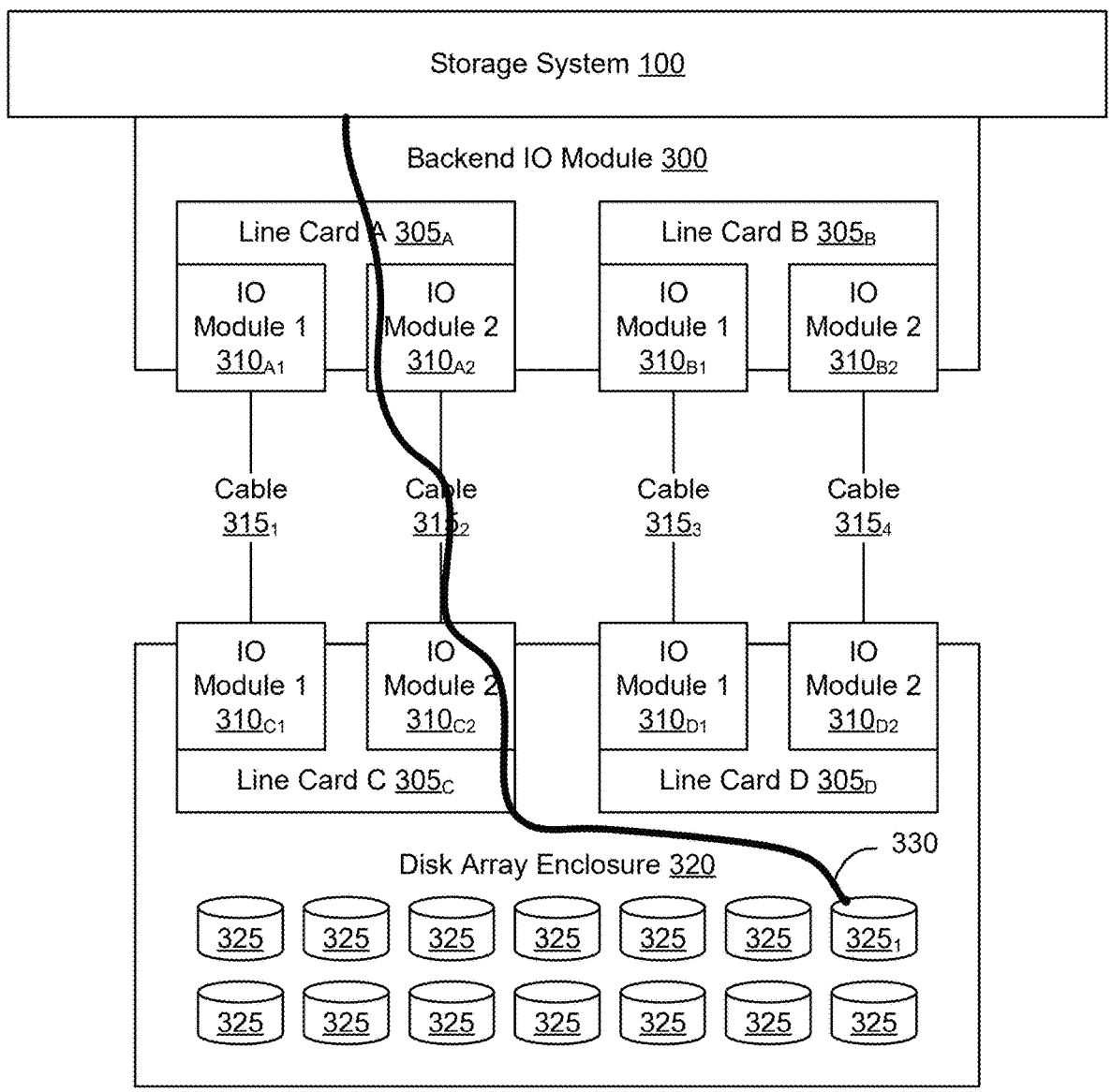
FIG. 3 is a block diagram showing an example set of interrelated system components, according to some embodiments.

FIG. 3 is a block diagram showing an example set of interrelated system components, according to some embodiments. Specifically, FIG. 3 shows a hypothetical example of a set of interconnected components that may be used to connect a backend IO module 300 of a storage system 100 to a disk array enclosure 320. As shown in FIG. 3, in some embodiments, the backend IO module 300 includes a set of line cards $305_A$, $305_B$, each of which has one or more IO modules $310_{A1}$, $310_{A2}$, $310_{B1}$, and $310_{B2}$. The IO modules physically connect to cables $315_1$, $315_2$, $315_3$, and $315_4$. The disk array enclosure 320 includes a similar set of line cards $305_C$, $305_D$, each of which has one or more IO modules $310_{C1}$, $310_{C2}$, $310_{D1}$, and $310_{D2}$ which also physically connect to cables $315_1$, $315_2$, $315_3$, and $315_4$.

FIG. 3 includes an example flow path of an IO operation (thick line 330) from the storage system 100 through the backend IO module 300 to a selected disk $325_1$ of the disk array enclosure 320. As shown in FIG. 3, in this example the IO operation 330 has been illustrated as passing through line card $305_A$, IO module $310_{A2}$, cable $315_2$, IO module $310_{C2}$ of line card $305_C$, and then to the selected disk $325_1$. If one of these components fails, the attempted IO operation on the failed component will generate an error message associated with the failed component. However, in some embodiments error messages associated with one or more of the other components that had been selected to implement the IO operation may also be generated by the respective component. Alternatively, an error message that might be associated with multiple components on the IO path may be generated. For example, errors might be received from both line card $305_C$ and disk $325_1$. According to some embodiments, if additional errors are received from line card $305_C$ the system hardware error manager 200 will recognize the error pattern as being associated with a fault on line card $305_C$, and unindict disk $325_1$.

FIGS. 4A-4D are Venn diagrams showing occurrence of errors on an example set of interrelated system components over time, according to some embodiments. As shown in FIGS. 4A-4D, a Venn diagram can be drawn with a circle for each individual piece of hardware in the whole system representing errors, events, and faults that can result from a hardware fault with that specific piece of hardware or service event. Within the circle are various errors, events, and faults of various severity. There are points where the circles overlap, and this is where an individual error can occur from a fault or event with either piece of hardware associated with the overlapping diagram.

Figure 4A:
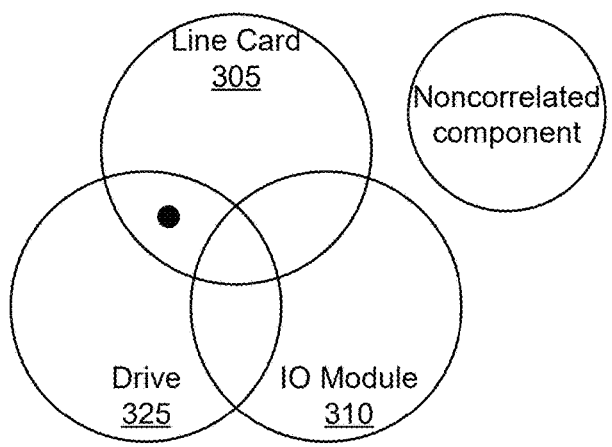
FIGS. 4A-4D are Venn diagrams showing occurrence of errors on an example set of interrelated system components over time, according to some embodiments.

FIGS. 4A-4D show a simplified Venn diagram for a storage system including one drive 325, one IO module 310, and one line card 305. As shown in FIG. 4A, at time T1 a first error occurs (black dot), which is a type of error that could be generated due to either a hardware fault in the line card 305, or a hardware fault in the drive 325. Accordingly, the black dot appears in the Venn diagram in the overlap region between line card 305 and drive 325.

Figure 4B:
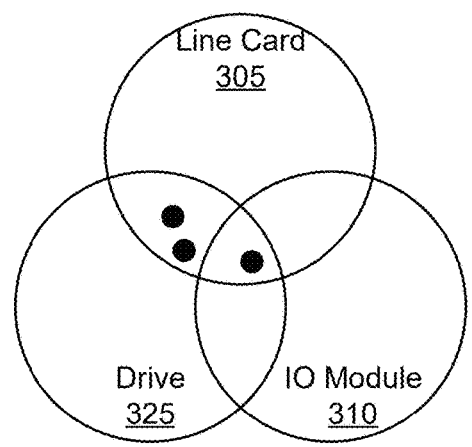

As shown in FIG. 4B, at time T2 several additional errors have occurred (black dots). One of the additional errors is the type of error that could be generated due to either a hardware fault in the line card 305, or a hardware fault in the drive 325. Another one of the additional errors is the type of error that could be generated due to either a hardware fault in the line card 305, or a hardware fault in the drive 325, or a hardware fault of the IO module 310.

Figure 4C:
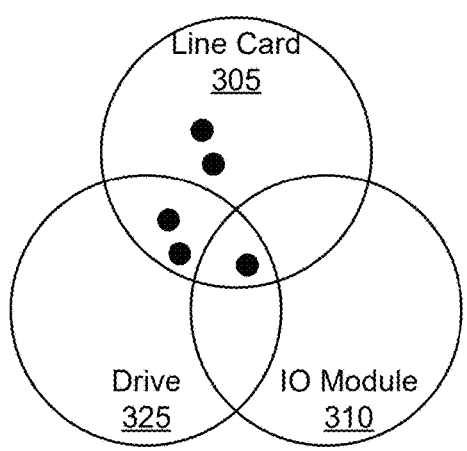
Figure 4D:
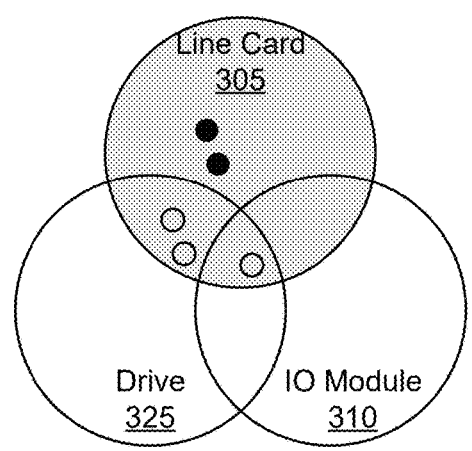

As shown in FIG. 4C, at time T3 another two errors have occurred that can be only caused by a fault of the line card 305. Accordingly, as shown in FIG. 4D, the system hardware error manager 200 indicts line card 305 and rolls back the errors on drive 325 and IO module 310 (as indicated by the hollow dots).

In some embodiments, the system hardware error manager 200 recognizes fault error patterns and correctly isolates the fault to the responsible piece of hardware and prevents domino failures and even recovers hardware that got failed while the faulty hardware was being isolated. The system hardware error manager 200 uses trained models of the error profiles associated with faulty and failing individual components. This prevents, for example, allowing the operating system to fail two drives in the same Redundant Array of Independent Disks (RAID) group in a very short space of time when the correct component to indict is a faulty Line (LCC) Card and recognizable error patterns are present that indict the LCC.

In some embodiments, the system hardware error manager 200 is intelligent enough to utilize these trained models so as not to fail the two drives in the same RAID group in a very short space of time when such a recognizable error pattern is present. In some embodiments, the system hardware error manager 200 is implemented as software executing on the storage system and has the capability to respond to and interpret the errors in the system correctly, so as to indict the correct hardware component in real time. While the same errors may increment the drive fatal error count collectively this recognizable error pattern should increment the LCC's fatal error count or the Back End Input/Output (BE IO) Module fatal error count also, which in turn would decrement the drive fatal error counts that got incremented during the interval where the LCC fatal error count or BE IO Module fatal error count got incremented during the interval where the pattern was being recognized. The LCC or BE IO Module would then be correctly isolated and failed out and the drives would be more resilient and any drives that had their fatal error counts incremented during this error pattern recognition interval would have these counts reversed. Any drive that failed from a fatal error count increment during the interval where the LCC or BE IO Module was being failed out would be recovered quickly and any direct memory sparing process that was initiated as a result of the previous indictment of one or more of the drives of the RAID group would be reversed. By providing a system hardware error manager 200, it is possible to cause the storage system to react to and failing the correct hardware component. This results in the storage system being more resilient to component failures and provides the ability for the storage system to heal any collateral damage that occurred while the faulty component was failing. The example chosen concerns Drives and LCC's in a Disk Array Enclosure (DAE) and Back End Input/Output (BE IO) Modules but can also apply to other areas of the system where there are hardware and software dependencies between physical components such as Dual In-line Memory Modules (DIMM's) and Directors Cards, Front Channel Small Form Factor Pluggable (SFP) modules and Adapters etc.

The system hardware error manager is responsible for keeping track of all errors and events for all hardware in the system and ensuring the correct components are isolated and failed out with hardware failures having as little impact as possible on the system. Rather than simply logging errors of failing components and depending on support personnel to triage the historical errors and select the correct components for replacement, the storage system will now recognize the correct faulty component or components and protect the system from domino failures. A system view is taken and errors that are expected on other components when one specific hardware component fails will no longer cause those other components to also fail based solely on these now explainable errors. Upon recognition of a faulty component, the system hardware error manager takes measures to shield other dependent components and even recovers falsely indited and failed components where the errors they encountered are classified as expected from the specific failure of the faulty component. When the system hardware error manager becomes aware that a component is starting to fail and has registered a number of errors, events or faults with that component within a recent time interval, this knowledge now means that the system hardware error manager will react to and behave differently towards errors taken by other components that can now be attributed with a high degree of certainty and probability as being due to the component with the now recognized hardware fault.

In some embodiments, the system hardware error manager 200 is programmed with trained models for the various failure modes of each hardware component in the system. A journal is kept of important hardware events and errors for each component. One of the tasks of the system hardware error manager 200 is that, when a sequence of events and/or errors are detected for a component that indicate the component is faulty, the component is isolated and failed out for replacement as early as possible rather than waiting for the component to take harder errors and impact other components. In some embodiments, the system hardware error manager 200 uses the indictment of a component that it has registered as faulty, actively failing, or failed, and uses this determination to avoid the failure of other components that take or have taken what are now considered expected errors as a result of the failure of the indicted faulty component.

Unfortunately, some components can fail suddenly and with catastrophic consequences for the immediate operation of other dependent components in the system. It can be the case that multiple components suffer failure as a result of a single faulty component failing. In some embodiments, the system hardware error manager 200 makes decisions and takes measures in response to the decisions to contain the failure and reduce system impact. For instance, when the system hardware error manager 200 indicts a particular LCC or Cable, the system hardware error manager 200 will disable that LCC or port rather than allowing the errors to increment the fatal error counts for other dependent components, such as drives, which could potentially cause one or more drives to also be indicted.

As the system hardware error manager 200 is monitoring all components of the storage system, the system hardware error manager 200 can see a larger picture when a hardware failure occurs. For some hardware failures, such as the failure of an LCC, card errors and events on other dependent components such as drives can be expected. Unfortunately, this correlation is currently not made and multiple drives can drop as a result of a failing LCC card, cable, or IO module. By monitoring errors and events within the system for all hardware components the system hardware error manager 200 can recognize when a component starts to fail. The system hardware error manager 200 monitors all hardware errors and events for recognizable patterns that indicate not only the failures of individual components but also the patterns of false errors and indictments against dependent components that can occur while a hardware component is in the process of failing. This is a result of the two components being closely coupled in terms of their software operation and function.

For example the system hardware error manager 200 may see that 30% of a learned and recognizable failure pattern for a faulty LCC card has just occurred, and that during the same time interval some fatal errors have also been taken my a number of drives dependent on that LCC that on their own may cause these drives to be failed but in tandem with the real hard errors on the LCC and the recognized 30% fault pattern for the LCC card the drive errors may be considered expected. Accordingly, in response to detection of the error pattern, the system hardware error manager 200 will not fail the drives solely on these now expected errors. On the other hand, if the drive errors were to occur on their own, without other errors present such as those described for the LCC, then upon occurrence of enough such errors the system hardware error manager 200 will indict the drive as normal.

There are areas of overlap concerning the various hardware components fault related errors and events. For example, there are drive fault related errors and events and LCC fault related errors and events that can occur when either component is faulty. Unfortunately, this can mean that healthy hardware is failed in the presence of these errors and events. However, by utilizing known trained hardware fault profile models the system hardware error manager 200 can recognize the most important errors and events and correctly indict the correct faulty hardware faster and even acquit any falsely indited hardware. The system hardware error manager 200 uses this new modality function to recognize errors on other components that can now be considered recoverable errors in the presence of the real recognized fault, which previously on their own would have caused healthy components to fail. If the system hardware error manager 200 finds that a related component had its fatal error count incremented at the time the real faulty component was failing and being isolated, then in some embodiments the system hardware error manager 200 retrospectively decrements this fatal error count for the healthy component.

In some embodiments, the machine learning model of the system hardware error manager 200 is programmed to learn various scenarios for all components from errors seen in field systems, and from performing targeted injection testing in-house. In some embodiments, the system hardware error manager 200 is trained by performing discovery testing to train the machine learning models using injected hardware and software faults as well as service events. Each scenario would have a recognizable error and event pattern. In some embodiments, new errors and events are also added to help train the models for specific service events and scenarios such as the start of field service events and Field Replaceable Unit (FRU) replacements. In some embodiments, the system hardware error manager 200 is also configured to be queried by a script associated with any field service event to determine from the system hardware error manager 200 if it is OK or not OK to proceed with the planned service event.

Areas where the same errors overlap, or in may happen when either of several components is faulty, indicate how closely coupled the two hardware components are in terms of their software operation. In some embodiments, the system hardware error manager 200 is programmed for specific recoverable scenarios such as a cable pull, hardware replacement, or other recoverable hardware event, so that no other hardware suffers or fails from expected errors and events attributable to these scenarios, thus improving storage system resiliency.

A complete Venn diagram can be drawn for the entire storage system with a circle for each individual piece of hardware in the whole storage system representing errors, events, and faults, that can result from a hardware fault with that specific piece of hardware or service event. Within the circle are various errors, events, and faults of various severity. There are points in the Venn diagram where the circles overlap, and this is where an individual error can occur from a fault or event with either piece of hardware associated with the overlapping area.

When an individual part is replaced, the error journal for that part in the system hardware error manager 200 is cleared and the new serial number part is entered into the system hardware error manager 200. Rules can also be added to the system hardware error manager 200 to mark certain errors as expected for one component when it or another component are below a specific firmware level.

Based on the observed errors and events the system hardware error manager 200 calculates, based on the information it currently has available to it, the probability of which component or components are most likely to be faulty or going faulty at a particular time, and starts to take mitigation measures to prevent impact to other dependent but healthy hardware components from being falsely indited. For instance, if there are errors and events in the LCC circle and in the overlapping segment between Drive and LCC and little or no drive only failures and the system hardware error manager 200 has partially detected (30% score) or even fully detected (100% score) a faulty error profile/pattern for the LCC, then a drive that took those errors in the overlapping segment between drive and LCC should not be failed to Not Ready state. By detecting when a particular LCC or cable is suspect and disabling that LCC or port, rather than allowing the error to increment the fatal error count for drives too fast and dropping multiple drives, the drives are thereby protected from the failure.

Furthermore, with this added intelligence the system hardware error manager 200 is able to recognize that a component is failing and prevent two drives in the same RAID group that are common to this LCC, and occupy a common disk array enclosure, from being dropped Not Ready in this time interval where the system hardware error manager 200 has received one or more errors from the LLC and is in the process of recognizing an error pattern associated with a faulty LCC component. As healthy drives are protected from dropping Not Ready, undue performance impact and even data unavailability from this LCC failure is prevented.

The system hardware error manager 200 reacts when it detects a component going bad and protects the storage system from any additional undue impact from a single failing hardware component. The system hardware error manager 200 also has wider system error knowledge and in some embodiments also prevents or lessens the impact of dual hardware failures. For example, if one drive in a RAID group is failed and another drive in the same RAID group and even in a different disk array enclosure in the system starts to take some lesser errors like drive media errors, then the system could dial home with an escalated severity error code to expedite the resolution of the failed drive. In this example, enabling the system hardware error manager 200 to have wider system knowledges and taking corrective action prevents the operating system from failing two drives in the same RAID group in a very short period of time. The system hardware error manager 200 is intelligent enough to utilize these trained models so as not to fail the two drives in the same RAID group in a very short space of time when such a recognizable error pattern is present. By providing the storage system with a system hardware error manager 200, the storage system now possesses the ability to avoid this scenario, and any drives that had their fatal error counts incremented during this error pattern recognition interval would have these counts reversed.

In some embodiments, the system hardware error manager 200 also notifies the operating system that a component looks to be starting to fail and that mitigation measures in the code should be taken to drive I/O operations through alternative hardware paths even before the component has fully failed. This enables the IO operations on a failing component to be reduced prior to replacement of the component.

The system hardware error manager 200 also decides at which point it can safely isolate and disable the detected faulty component. Dual hardware faults can still occur, but the system hardware error manager 200 provides a layer of intelligence which quickly separates and decouples hardware/software independencies to make the system more resilient when individual hardware component failures occur. As mentioned above, in some embodiments the system hardware error manager 200 is also configured to escalate and generate a critical dial home event to expedite recovery when the system is operating in a degraded state with a failed component and errors are detected on the remaining operational redundant component, thus reducing the likelihood of occurrence of a dual hardware failure.

In some embodiments, the system hardware error manager 200 will not only isolate the faulty component faster and fail it out but the system hardware error manager 200 will also protect and even recover any components which may have been impacted as collateral damage while the faulty component was in the process of failing and being failed out. In some embodiments, the trained model of the system hardware error manager 200 is trained to recognize the real faulty component and take measures to protect other components from collateral impact at the moment of its failure. In some embodiments, the trained models are able to retrospectively recognize which components were truly to blame for the errors and fatal error increments and responsively protect and recover any other components that were falsely indited during the time interval where the faulty component was failing and being failed out and isolated.

In some embodiments, the system hardware error manager 200 has the ability to effectively apply the brakes gently when a critical component encounters a sudden failure and prevent performance impact and potential data unavailability. The system hardware error manager 200 has the intelligence to recognize the correct faulty component earlier and use protection mechanisms to not allow dual hardware failures to occur, such as the failing of two drives in the same RAID group within a short interval of time, when there is a recognizable error pattern present to indict the common singularly responsible hardware component such as a single LCC. Similarly, the system hardware error manager 200 in some embodiments is configured to delay the failure of a second drive in a RAID group, and escalate the severity of any dial home errors for components where the hardware in the redundant path already has errors. For instance, if LCC A is failed and LCC B takes a high severity error the severity of this call home error is escalated.

The system hardware error manager 200, in some embodiments, has awareness of what components have taken what errors in the recent past and uses this information to achieve containment. The system hardware error manager 200 prevents and even reverses fatal error increments against healthy components thus negating the need for their replacement, thus reducing field service costs. This also has the potential effect of increasing customer confidence in the storage system, since the system hardware error manager 200 is able to correctly indict the correct components, prevent indictment of healthy components, and thus result in replacing fewer components over time. The field team will also be more likely to replace the correct faulty component the first time a field replacement is implemented. The overall result is less customer impact from hardware failures, fewer hardware replacements, reduced service costs and improved customer satisfaction. As the system more gracefully handles failed and failing components, complex recovery scenarios are avoided.

FIG. 5 is a flow chart of an example process of training an error analysis engine to learn a recursion between error patterns and indictable and unindictable interrelated system components, and deploying the trained error analysis engine to analyze system errors and implement actions based on detected learned error patterns, according to some embodiments. As shown in FIG. 5, in some embodiments labeled training examples of error patterns are created (block 500), with each training example correlating a set of error messages from a set of components with an indicted component and one or more unindicted components. Additional details associated with generation of labeled training examples are provided in connection with FIGS. 6-8.

The labeled training examples are applied to an error analysis engine (block 505) to train the error analysis engine using a supervised training process to learn a recursion between the error pattern as the independent variable and component indictment as the dependent variable (block 510). The labeled training examples, in some embodiments, are also used to train the error analysis engine to learn a recursion between the error pattern as the independent variable and unindicted component(s) as the dependent variable (block 515). In some embodiments, the error analysis engine learns the recursion between the error pattern and the indictable component, and in connection with learning that recursion, also learns other components that generate dependent errors when the indicted component fails (combining blocks 510 and 515 into a single recursion).

In some embodiments, the error analysis engine is a supervised machine learning process that is provided with labeled training examples to learn the recursions described above. An example supervised machine learning processes may be implemented using a neural network or another type of machine learning process configured to be trained using a supervised learning process using labeled training examples. The supervised machine learning process is a classification process, in which the observed properties are the error patterns and the categories to be predicted are the identities of the components to be indicated. In some embodiments, a machine learning process configured to implement a classification process is trained to identify which component, of a set of possible storage system components, belongs to a particular observation, where the observation is a set of errors from a set of related storage system components.

As shown in FIG. 5, during training of the error analysis engine (block 505), the error analysis engine is periodically tested to determine if it is trained (block 520). For example, the error pattern of a labeled training example may be provided to the error analysis engine and the error analysis engine may be used in a predictive manner to generate as an output a predicted component to be indicted. In response to a determination that the error analysis engine correctly predicted the component to be indicated by predicting the label (indicted component) of the training example, the error analysis is determined to be trained (a determination of YES at block 520) and may be deployed to look for errors of the error type. In response to a determination that the error analysis engine did not correctly predict the component to be indicated by predicting the label (indicted component) of the training example, the error analysis is determined to not be sufficiently trained (a determination of NO at block 520) and the process returns to block 505 to continue training the error analysis engine.

It should be noted that there are many instances where there are dependent components. For example, failure of component A might cause components A, B, and C to all generate errors, whereas failure of component D might cause components D, E, F, and G to all generate errors. Accordingly, in some embodiments, multiple sets of training examples are created, one set for each type of component correlating error patterns with failure of that type of component, and the error analysis engine is trained to learn multiple error patterns and associate each class of error patterns with a particular indictable component. Accordingly, it is possible to determine that the error analysis engine is trained sufficiently with respect to one class of error patterns while not being sufficiently trained with respect to another class of error patterns. In this example, the error analysis engine might be determined to be trained and have learned the error patterns associated with failure of component A, while not being fully trained and not having sufficiently learned the error patterns associated with failure of component D. Thus, it is possible to incrementally train the error analysis engine to learn additional dependent error patterns between indictable and unindictable components over time, as additional training examples are generated.

As shown in FIG. 5, once the trained error analysis engine is deployed (block 525) the trained error analysis engine monitors error messages to identify known error patterns (block 530). In response to a determination that the error messages don't match any known error pattern (a determination of NO at block 530) the trained error analysis engine continues to monitor errors as they are received and over time. In response to a determination that a subset of the error messages match a known error pattern (a determination of YES at block 530) the system hardware error manager 200 implements the actions corresponding to the detected error pattern (block 535).

In some embodiments, when the system hardware error manager 200 implements the actions corresponding to the detected error pattern (block 535) the actions are evaluated by a customer service engineer to verify the output of the trained error analysis engine before the actions are implemented. For example, if the trained error analysis engine identifies an error pattern as a failed IO module, and the action is to isolate the indicted IO module by causing all IO operations to be implemented via an alternative IO module on the line card, this action may be reported using a dial home message to enable a customer service engineer to manually verify that the IO module should be indicted. In some embodiments, where the output of the trained error analysis engine is evaluated, the customer service engineer will determine whether the trained error analysis classification was correct (block 545). In response to a determination that the classification was correct (a determination of YES at block 545), the detected error pattern is used to generate a labeled training example (block 555). In response to a determination that the classification was incorrect (a determination of NO at block 545) the detected error pattern may be relabeled with the component that should have been indicted (block 550) and the relabeled error pattern may be used to generate a labeled training example (block 555). The newly created training example may then be applied to the error analysis engine (block 560) to refine the training of the error analysis engine.

Figure 8:
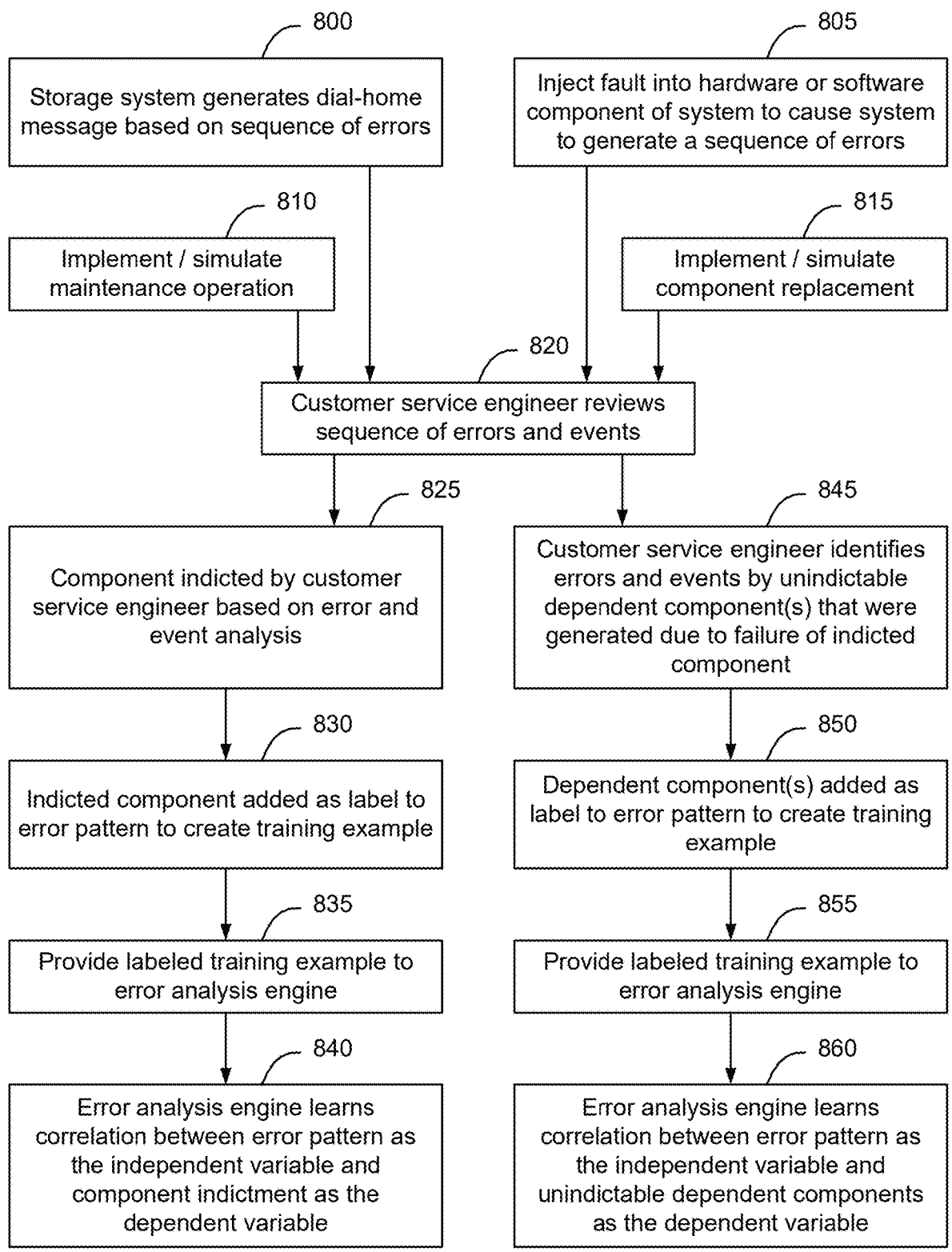

FIGS. 6-8 are flow charts of example methods of creating labeled training examples for use in training the error analysis engine to learn a recursion between error patterns and indictable and unindictable interrelated system components, according to some embodiments.

FIG. 6 is a flow chart of an example method of creating labeled training examples by injecting faults into a storage system and observing errors that occur as a result of the fault injection. The error pattern that results from the error injection is then labeled with the identity of the component that was the subject of the fault injection, to create training examples that may be used to train the error analysis engine to learn a recursion between the observed error patterns with the identity of the component as the classification to be indicted.

As shown in FIG. 6, in some embodiments a fault is injected into a selected component (block 600). A determination is then made if one or more errors was generated as a result of injection of the fault into the selected component (block 605). In response to a determination that no errors were generated (a determination of NO at block 605) there is no error pattern to learn and the process of generating a training example ends. In response to a determination that one or more errors were generated (a determination of YES at block 605), the errors of the error pattern are recorded (block 610) and the recorded error pattern is labeled with the identity of the type of the indicted component. The label recorded error pattern thus forms a training example correlating error pattern with component indictment (block 615).

In some embodiments, a determination is made as to whether some of the errors that were included in the error pattern were generated by components other than the component that had the injected fault (block 620). If all of the errors that were generated in response to the fault injection were from the selected component (a determination of NO at block 620), there are no detected dependent components to the selected component and the process ends.

If some or all of the errors that were generated in response to the fault injection were from components other than the selected component (a determination of YES at block 620), the components other than the selected component that generated errors are possibly dependent components. In some embodiments, the components other than the selected component that reported errors are evaluated to determine if the components that reported errors after injection of the fault are logically related to the selected component (block 625). While injecting an error into one component of an executing storage system, it is possible for other organic errors to occur in other components of the storage system that are completely unrelated to the selected component. Accordingly, in some embodiments a determination is made as to whether the logical relationship exists between the components thereby cleansing the error pattern to include errors only from components of the storage system that are logically related. In response to a determination that some of the error patterns are from unrelated components, the errors from the unrelated components are removed from the error pattern (block 635). The cleansed error pattern is then labeled with the identity of the indicted component that was selected for fault injection, and also labeled with a set of unindicted related components that generated one or more errors in response to the fault injection, and forms a training example for use in training the error analysis engine (block 640).

FIG. 7 is a flow chart of an example method of creating labeled training examples when customer service engineers are engaged to determine a root cause of a set of errors associated with an error pattern to indict a faulty component, according to some embodiments. As shown in FIG. 7, while storage systems are executing, a given storage system may register a sequence of errors that result in generation of a dial home message to request that a customer service engineer become involved to take corrective action on the storage system. Accordingly, a set of errors associated with an error pattern will be received from a set of components of the functioning deployed storage system (block 700). The error pattern is then analyzed, for example by a customer service engineer (block 705), to attempt to indict a component of the storage system (block 710) that is the root cause of the error pattern on the storage system and should be reset or replaced.

If the customer service engineer is not able to indict any particular component (a determination of NO at block 710) the process ends and no training example is created from this particular received error pattern. If the customer service engineer is able to indict a particular component (a determination of YES at block 710), the analyzed error pattern is labeled with the identity of the indicted component to create a training example correlating the error pattern with the component indictment (block 715).

A determination is then made as to whether the error pattern contains errors only from the indicted component or if the error pattern contains errors from other components as well as the indicted component (block 720). In response to a determination that the error pattern does not contain any errors from components other than the indicted component (a determination of NO at block 720), the process ends and the training example created in block 715 is used as a training example for the error analysis engine.

In response to a determination that the error pattern contains errors from components other than the indicted component (a determination of YES at block 720), a determination is made as to whether the errors by components other than the indicted component are logically related to the indicted component (block 725). In some embodiments, the logical relationships between components are pre-programmed into a data structure and a computer parses errors that are from logically related components and logically unrelated components.

In response to a determination that all of the errors in the error pattern are from storage components that are logically related to the indicted component (a determination of YES at block 725) the error pattern is deemed to be cleansed of any spurious errors. In response to a determination that one or more of the errors in the error pattern are from storage components that are not logically related to the indicted component (a determination of NO at block 725), the errors from those unrelated components are removed from the error pattern to cleanse the error pattern (block 730). The cleansed error pattern, that is labeled with the identity of the indicted component, and also labeled with a set of unindicted related components that generated one or more errors in response to the fault injection, is used as a training example for use in training the error analysis engine (block 735).

FIG. 8 is a flow chart of an example method of creating separate labeled training examples correlating respective error patterns to both indicted components and unindicted components, according to some embodiments. As shown in FIG. 8, there are many ways that error patterns may be generated, depending on the actions that are occurring on the storage system. For example, as shown in FIG. 8, a storage system may be operating and experience a series of errors that results in a dial home message (block 800). This is described in greater detail in connection with FIG. 7. Likewise, a storage system may be operating in a test environment and a fault may be injected into a hardware component or software component of the storage system (block 805). This is described in greater detail in connection with FIG. 6. Additionally, errors may be generated in connection with implementation of an actual or simulated maintenance operation (block 810) or in connection with implementation or simulation of a component replacement (block 815).

In some embodiments, as shown in FIG. 8, a customer service engineer reviews the sequence of errors and events (block 820). A component associated with the error pattern is indicted by the customer service engineer (block 825). The indicted component is added as a label to the error pattern (block 830) to create a training example. The training example is then provided to the error analysis engine (block 835) The error analysis engine uses the labeled training example to learn a correlation between error pattern as the independent variable and component indictment as the dependent variable (block 840). When deployed, the trained error analysis engine will recognize error patterns similar to the error pattern of the training example and classify the recognized error pattern as being correlated to the indicted component.

In some embodiments, as shown in FIG. 8, when the customer service engineer reviews the sequence of errors and events (block 820), the customer service engineer also identifies errors and events by unindictable dependent components that were generated due to the failure of the indicted component (block 845). The unindicted dependent component(s) are added as a label to the error pattern (block 850) to create a training example. The training example is then provided to the error analysis engine (block 855). The error analysis engine uses the labeled training example to learn a correlation between error pattern as the independent variable and the unindicted dependent component(s) as the dependent variable (block 860). When deployed, the trained error analysis engine will recognize error patterns similar to the error pattern of the training example and classify the recognized error pattern as not being correlated to unindicted dependent component(s). In some embodiments, as noted above, the trained error analysis engine uses the training related to unindicted dependent components to identify errors associated with the unindicted dependent components that occurred during the identified error pattern, to determine which errors should be rolled back on the unindicated dependent components.

FIG. 9 is a flow chart of an example process of deploying a trained error analysis engine to analyze system errors and implement actions based on detected learned error patterns, according to some embodiments. As shown in FIG. 9, in some embodiments the system hardware error manager 200 receives errors from system components of an executing storage system. The trained error analysis engine analyzes the errors as they are received by the system hardware error manager 200 and attempts to recognize known error patterns (block 905). In response to a determination that no recognized error pattern exists (a determination of NO at block 905), the system hardware error manager 200 continues to receive errors that are analyzed by the trained error analysis engine.

In response to a determination that a recognized error pattern exists (a determination of YES at block 905), the trained error analysis engine identifies the component to indict from the learned recursion (block 910) and optionally notifies the operating system of the intended indictment. The operating system may indict the component, generate a dial home message, or take other actions in response to the notification of the indictment by the trained error analysis engine.

The trained error analysis engine also determines if there are errors contained in the error log from other components that have learned to be dependent on the indicted component (block 920). In response to a determination that no dependent components have generated any errors in connection with the errors generated by the indicted component (a determination of NO at block 920), the process ends.

In response to a determination that one or more dependent components have generated errors in connection with the errors generated by the indicted component (a determination of YES at block 920), a determination is made if the errors on the correlated components occurred after the start of the recognized error pattern (block 925). It sometimes takes a period of time for an error pattern to emerge and be recognized by the trained error analysis engine. However, only errors by dependent components that occur after the onset of the error pattern that resulted in indictment of the indicted component should be rolled back. According, in response to a determination that the errors on the correlated components didn't occur after the start of the recognized error pattern (a determination of NO at block 925), the process ends.

In response to a determination that the errors on the correlated components occurred after the start of the recognized error pattern (a determination of YES at block 925), the error count on the dependent correlated components is decremented by removing any errors from the correlated components that were recorded after the start of the recognized error pattern (block 930).

Additionally, as shown in FIG. 9, in some embodiments a determination is also made as to whether one or more of the dependent components has also been indicted. In response to a determination that no dependent component has been indicted (a determination of NO at block 935) the process ends. In response to a determination that one or more of the dependent component has been indicted as a result of occurrence of the recognized error pattern (a determination of YES at block 935), actions are taken to unindict the correlated component.

As an example, in some instances a failure of a cable 315, IO module 310, or line card 305, can cause multiple disks 325 on the disk array enclosure 320 to rapidly issue error messages. In instances where a group of disks 325 are organized in a RAID group, and generation of error messages causes one of the disks of the RAID group to be indicted, the RAID group may use a process to replace the indicted disk with a spare disk and start to rebuild the RAID group. In some embodiments, when a dependent component such as the disk is identified as being dependent on a indicted related component, the original RAID group may be restored and rebuilding of the RAID group may be terminated. By providing the ability to unindict a system component it is possible to avoid unnecessary replacement of healthy components. Additionally, by enabling the storage system to continue using components that are determined to be healthy and only indicted due to reliance on another indicted system component, it is possible to maintain the storage system in a healthier overall state with a greater percentage of components operational, thus improving the overall operation of the storage system.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of intelligently recognizing faulty component error patterns to prevent cascading errors from causing indictment of healthy hardware components, comprising:
   receiving, by a system hardware error manager implemented as software executing on a storage system, errors messages from all components of a storage system;
   analyzing the error messages by a trained machine learning process of the system hardware error manager to recognize error patterns correlated to storage system component failures, the trained machine learning process having been trained to learn a recursion between the error patterns as independent variables, and indictable storage system components and unindictable dependent storage system components as dependent variables, wherein indictable storage system components are storage system components that are actually failing or have actually failed, and unindictable storage system components are storage system components that are not actually failing or have not actually failed;
   in response to a determination that the received error messages contain a recognized error pattern, classifying the error pattern to indict the corresponding indictable storage system component and to identify the unindictable dependent storage system components;
   in further response to the determination that the received error messages contain the recognized error pattern, removing any errors from the unindictable dependent storage system components that were received by the system hardware error manager after a start time of the recognized error pattern; and
   implementing actions associated with the recognized error pattern, by the system hardware error manager on the indictable storage system component, to isolate and disable the indictable storage system component, and to prevent the unindictable storage system components from being classified as failed;
   generating a dial-home message to provide notice of the indictable storage system component; and
   determining if any of the unindictable dependent storage system components were falsely indicted due to errors that were received by the system hardware error manager after the start time of the recognized error pattern, and in response to a determination that one or more of the unindictable dependent storage system components were falsely indicted, initiating recovery of the unindictable dependent storage system components that were falsely indicted.

2. The method of claim 1, wherein the trained machine learning process is trained using a supervised training process using labeled training examples, each labeled training example including an error pattern containing a sequence of errors that occurred over time and a label, the label identifying a corresponding indictable storage system component.

3. The method of claim 2, wherein a first subset of the errors of the sequence of errors were generated by the indictable storage system component and a second subset of the errors of the sequence of errors were generated by one or more corresponding unindictable components.

4. The method of claim 2, wherein the labeled training examples are created from observed error patterns generated by executing storage systems that are labeled by customer service engineers in connection with performing root cause analysis.

5. The method of claim 2, wherein the labeled training examples are created by injecting errors into components of a storage system, observing respective error pattern that are generated by the storage system, and labeling the respective error pattern with the identity of the component that received the injected error.

6. The method of claim 2, wherein the labeled training examples are created by implementing maintenance operations on a storage system or performing component replacements on the storage system, observing respective error patterns that are generated by the storage system, and labeling the respective error patterns with the identity of the respective maintenance operations or component replacements.

7. The method of claim 1, wherein the trained machine learning process is a classification process, in which observed properties are the error patterns and the categories to be predicted are the identities of the components to be indicated.

8. The method of claim 1, wherein the trained machine learning process is a neural network.

9. The method of claim 1, wherein analyzing the error messages by a trained machine learning process to recognize error patterns correlated to storage system component failures comprises determining that an error pattern is associated with one component of a pair of redundant components, determining that the other one component of the pair of redundant components has previously been indicted, and generating a critical dial home event to expedite recovery of the remaining operational component of the pair of redundant components.

10. A system for intelligently recognizing faulty component error patterns to prevent cascading errors from causing indictment of healthy hardware components, comprising:
one or more processors and one or more storage devices storing instructions that are configured, when executed by the one or more processors, to cause the one or more processors to perform operations comprising:
receiving, by a system hardware error manager implemented as software executing on a storage system, errors messages from all components of a storage system;
analyzing the error messages by a trained machine learning process of the system hardware error manager to recognize error patterns correlated to storage system component failures, the trained machine learning process having been trained to learn a recursion between the error patterns as independent variables, and indictable storage system components and unindictable dependent storage system components as dependent variables, wherein indictable storage system components are storage system components that are actually failing or have actually failed, and unindictable storage system components are storage system components that are not actually failing or have not actually failed;
in response to a determination that the received error messages contain a recognized error pattern, classifying the error pattern to indict the corresponding indictable storage system component and to identify the unindictable dependent storage system components;
in further response to the determination that the received error messages contain the recognized error pattern, removing any errors from the unindictable dependent storage system components that were received by the system hardware error manager after a start time of the recognized error pattern; and
implementing actions associated with the recognized error pattern, by the system hardware error manager on the indictable storage system component, to isolate and disable the indictable storage system component, and to prevent the unindictable storage system components from being classified as failed;
generating a dial-home message to provide notice of the indictable storage system component; and
determining if any of the unindictable dependent storage system components were falsely indicted due to errors that were received by the system hardware error manager after the start time of the recognized error pattern, and in response to a determination that one or more of the unindictable dependent storage system components were falsely indicted, initiating recovery of the unindictable dependent storage system components that were falsely indicted.

11. The system of claim 10, wherein the trained machine learning process is trained using a supervised training process using labeled training examples, each labeled training example including an error pattern containing a sequence of errors that occurred over time and a label, the label identifying a corresponding indictable storage system component.

12. The system of claim 11, wherein a first subset of the errors of the sequence of errors were generated by the indictable storage system component and a second subset of the errors of the sequence of errors were generated by one or more corresponding unindictable components.

13. The system of claim 11, wherein the labeled training examples are created from observed error patterns generated by executing storage systems that are labeled by customer service engineers in connection with performing root cause analysis.

14. The system of claim 11, wherein the labeled training examples are created by injecting errors into components of a storage system, observing respective error pattern that are generated by the storage system, and labeling the respective error pattern with the identity of the component that received the injected error.

15. The system of claim 11, wherein the labeled training examples are created by implementing maintenance operations on a storage system or performing component replacements on the storage system, observing respective error patterns that are generated by the storage system, and labeling the respective error patterns with the identity of the respective maintenance operations or component replacements.

16. The system of claim 10, wherein the trained machine learning process is a classification process, in which observed properties are the error patterns and the categories to be predicted are the identities of the components to be indicated.

17. The system of claim 10, wherein the trained machine learning process is a neural network.

18. The system of claim 10, wherein analyzing the error messages by a trained machine learning process to recognize error patterns correlated to storage system component failures comprises determining that an error pattern is associated with one component of a pair of redundant components, determining that the other one component of the pair of redundant components has previously been indicted, and generating a critical dial home event to expedite recovery of the remaining operational component of the pair of redundant components.

19. A method of intelligently recognizing faulty component error patterns to prevent cascading errors from causing indictment of healthy hardware components, comprising:

receiving, by a system hardware error manager implemented as software executing on a storage system, errors messages from all components of a storage system;

analyzing the error messages by a trained machine learning process of the system hardware error manager to recognize error patterns correlated to storage system component failures, the trained machine learning process having been trained to learn a recursion between the error patterns as independent variables, and indictable storage system components and unindictable dependent storage system components as dependent variables, wherein indictable storage system components are storage system components that are actually failing or have actually failed, and unindictable storage system components are storage system components that are not actually failing or have not actually failed;

in response to a determination that the received error messages contain a recognized error pattern, classifying the error pattern to indict the corresponding indictable storage system component and to identify the unindictable dependent storage system components;

in further response to the determination that the received error messages contain the recognized error pattern, removing any errors from the unindictable dependent storage system components that were received by the system hardware error manager after a start time of the recognized error pattern; and implementing actions associated with the recognized error pattern, by the system hardware error manager on the indictable storage system component, to isolate and disable the indictable storage system component, and to prevent the unindictable storage system components from being classified as failed; and generating a dial-home message to provide notice of the indictable storage system component;

wherein analyzing the error messages by a trained machine learning process to recognize error patterns correlated to storage system component failures comprises determining that an error pattern is associated with one component of a pair of redundant components, determining that the other one component of the pair of redundant components has previously been indicted, and generating a critical dial home event to expedite recovery of the remaining operational component of the pair of redundant components.

* * * * *